Figure 7:
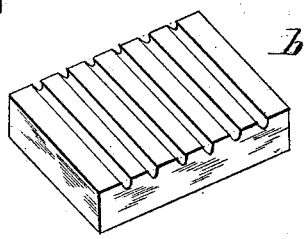

(No Model.) 2 Sheets—Sheet 1.
W. MARX.
DIE FOR FORMING TEETH IN VEGETABLE GRATERS.
No. 397,559. Patented Feb. 12, 1889.
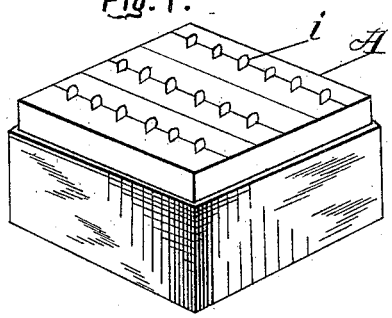
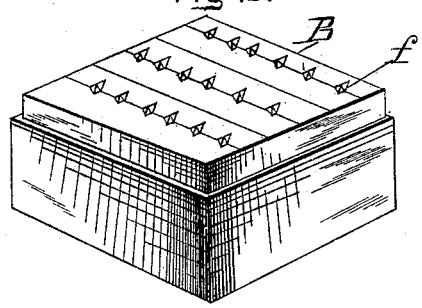
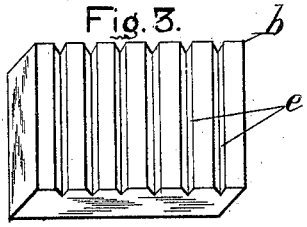
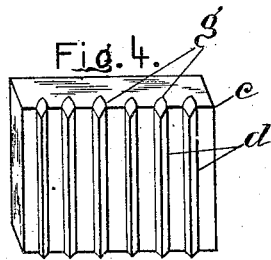
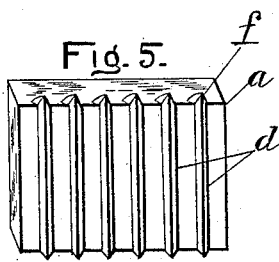
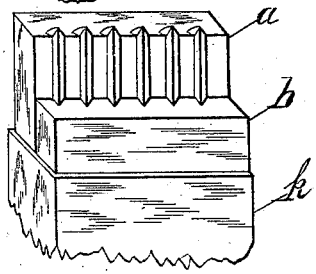
Witnesses
A. J. Cory.
F. R. Keys.
Inventor,
William Marx,
By Attorneys
Rogers and Cory (No Model.) 2 Sheets—Sheet 2.

W. MARX.
DIE FOR FORMING TEETH IN VEGETABLE GRATERS.

No. 397,559. Patented Feb. 12, 1889.

Witnesses
A. J. Cory
F. R. Keys.

Inventor,
William Marx.
By Attorneys
Rogers and Cory.

United States Patent Office.

WILLIAM MARX, OF BEAVER FALLS, PENNSYLVANIA.

DIE FOR FORMING TEETH IN VEGETABLE-GRATERS.

SPECIFICATION forming part of Letters Patent No. 397,559, dated February 12, 1889.

Application filed April 14, 1888. Serial No. 270,623. (No model.)

*To all whom it may concern:*

Be it known that I, WILLIAM MARX, a citizen of the United States, residing at Beaver Falls, in the county of Beaver and State of Pennsylvania, have invented certain new and useful Improvements in Dies for Forming Teeth in Sheet-Metal Vegetable-Graters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to dies for forming the teeth in sheet metal for vegetable or other graters.

The object of my invention is to form a male and female die in sections, so that in case any part of the die becomes broken it can be replaced without the loss of the entire die-plate, and, furthermore, to make a die of unusual strength and one that can be easily constructed and kept in order for the purpose required. I attain these objects by the mechanism illustrated in the drawings, in which—

Figure 8:
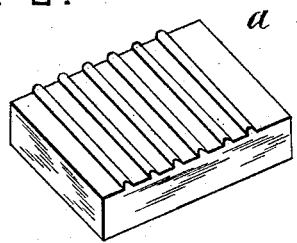
Figure 9:
Figure 10:
Figure 11:
Figure 12:

Figure 1 is a plan view of all the sections united into a female die. Fig. 2 is a plan view of the sections united to form a male die. Fig. 3 is a perspective view of one of the female sections applicable to either the male or female die. Fig. 4 is a perspective view of a male section of the female die. Fig. 5 is a perspective view of a male section of the male die. Fig. 6 is a perspective view of the sections of the male die, the male section being projected a distance above the accompanying die in order to show the manner of union. Fig. 7 is a perspective view of a female section of a modified form of my die. Fig. 8 is the male complement of the same. Fig. 9 is an end view of Fig. 4. Fig. 10 is an end view of Fig. 3. Fig. 11 is an end view of Fig. 8. Fig. 12 is an end view of Fig. 7.

A is the top face of the female die, or all of the sections of the female die united in a completed form.

B is the top face of the male die, or the assemblage of the sections corresponding and fitting into the female die. The female die and the male die alike are made up of a number of sections. $a$ is a male section of the male die.

$b$ is a female section applicable alike to either the male or female die. $c$ is a male section of the female die. The male sections of the dies are formed of rectangular blocks having angular ribs or ridges $d$ running parallel with and equidistant from each other. The female sections are composed of similar blocks having angular depressions $e$ so arranged that the male sections fit therein. The ridges on the male sections of the male dies project at one end beyond the edge of the block, forming teeth $f$, having a diamond-shaped contour and oval or angular on their surface. The male section $c$ of the female die has the parallel ridges $d$ fashioned out at $g$, so that when the section $c$ is united to that of $b$ the edges of the two sections leave openings $i$ corresponding in shape with and into which the teeth $f$ project when pressing out a tooth in sheet metal. The part of the die that forms the tooth penetrates the sheet metal a distance without cutting the metal except on one side, which side is called the "front" side of the tooth, and it is that side where the tooth's cutting-edge is. The highest point of the tooth above the sheet metal is in the front of the tooth, and the front of the tooth is the only side that forms an opening in the sheet metal. The left and the right side and the back side of the tooth form a continuous roof from the base of the sheet metal to the highest point of the tooth. This forms a hollow tooth, through the throat of which enter the gratings.

The modified forms illustrated in Figs. 7, 8, 9, 10, 11, and 12 do not differ in any manner, except that instead of the projections and indentations and the teeth formed being angular they are oval in contour and on their surfaces.

I can mold my die of self-hardening steel or steel with the temper drawn, or I can grind out the depressions and ribs, or I can set the ribs in dovetail slots, and should I break a tooth from off one of the projecting ribs I can draw out the rib and then grind it down to the proper shape, or I can cut the die down so that it will again project in the shape of a tooth, and thus use the same die without being compelled to make an entire new section. I can plane out the depressions and ribs. I can make the dies in long strips between a set of rollers turned out especially for that purpose with the depressions and the ribs and cut them into the desired lengths.

Another feature of my invention, on which I lay great stress, is that I arrange the ribs on the sections so that the teeth lie in diagonal lines in a number of sections, and then reversing the diagonal lines in the next number of sections, so that the diagonal lines start in one section and running toward the left hand across a number of sections, and then reversing the diagonal lines by starting in the next section and running toward the right hand across an equal number of sections, so that when the grater is in operation it carries the vegetable or fruit from side to side, which action insures more complete work.

The parts or sections of both male and female dies are held in place by any suitable means—preferably a socket, $k$, as illustrated in Fig. 6.

It will be observed that I have an arrangement of dies helically disposed right and left about a longitudinal axis; also that I have arranged these dies right and left, so that in operation the practical effect is to feed the material toward the middle of the cylinder and simultaneously to feed the material endwise from the center of the said cylinder. I have a natural lateral movement of the material toward and from the center of the cylinder, the practical effect of which is to thoroughly comminute and disintegrate the material.

It will also be observed that the device which I herein claim is practically like a form of type, to wit: each individual die is removable and can be sharpened at pleasure when taken from its form or combination of sections.

While I have described the points of the type or dies as diamond-shaped, it is clearly obvious that these points may be made of any other shape adapted to strike into sheet-metal burrs or teeth which will grate vegetable or other material, as specified.

Having thus described my invention, what I claim as new, and desire to secure by Letters Patent, is—

1. A die for the purpose described, consisting of two parts, one of which is formed of a number of grooved and ribbed sections, the ribs projecting from the face thereof and presenting points $f$, the other or female part also formed of a number of removable grooved and ribbed sections, but having the ends of the ribs removed to form cavities into which the points $f$ are adapted to fit.

2. A sectional die for the purpose described, composed of two parts, having grooved and ribbed faces of corresponding contour, the ribs of the sections of the male die projecting so as to form sharp vertical faces and sloping diamond or oval backs and means for holding the sections together.

3. A die for the purpose described, consisting of two parts, one of which is formed of a number of removable oval or angularly-grooved and ribbed sections, the ribs projecting from the face thereof and presenting points or teeth $f$, the other or female part also formed of a number of removable grooved and ribbed sections of contours similar to the male die, but having the ends of the ribs removed to form cavities into which the points $f$ are adapted to fit, and the points $f$ or teeth and the corresponding cavities arranged to lie in diagonal lines across the faces of the dies.

In testimony whereof I affix my signature in presence of two witnesses.

WILLIAM MARX.

Witnesses:
GEORGE H. GERBER,
G. L. EBERHART.